United States Patent [19]

Lane

[11] Patent Number: 4,662,701
[45] Date of Patent: May 5, 1987

[54] SINGLE COMMUNICATION LINE INTERCONNECT

[75] Inventor: David Lane, Greensboro, N.C.

[73] Assignee: AMP Incorporated, Harrisburg, Pa.

[21] Appl. No.: 729,824

[22] Filed: May 2, 1985

[51] Int. Cl.⁴ .......................................... H01R 29/00
[52] U.S. Cl. .............................. 339/176 M; 339/91 R
[58] Field of Search ......... 339/176 M, 176 MP, 18 R, 339/91 R

[56] References Cited

U.S. PATENT DOCUMENTS

| | | | |
|---|---|---|---|
| 2,759,161 | 8/1956 | Berg | 339/97 C |
| 3,101,231 | 8/1963 | Klostermann | 339/176 MP |
| 3,106,435 | 10/1963 | Yopp | 339/176 M |
| 3,193,793 | 7/1965 | Plunkett et al. | 339/176 M |
| 3,850,497 | 11/1974 | Krumreich et al. | 339/176 M |
| 3,954,320 | 5/1976 | Hardesty | 339/99 R |
| 3,990,764 | 11/1976 | Krumreich | 339/176 M |
| 4,152,037 | 5/1979 | Bonhomme | 339/176 MP |
| 4,221,445 | 9/1980 | Fleischhacker et al. | 339/18 R |
| 4,335,929 | 6/1982 | Abernathy | 339/97 R |

Primary Examiner—Neil Abrams
Attorney, Agent, or Firm—Robert W. Pitts; Eric J. Groen

[57] ABSTRACT

An electrical distribution system for use in selectively establishing interconnection between incoming circuits in a multiconductor cable and outgoing circuits employs a miniature ribbon connector and a single position outlet plug. The outlet plug employs round wire contacts to make interconnection to the flat resilient portions of miniature ribbon terminals. The outlet plugs are received within an adaptor housing mounted on the female mating face of a miniature ribbon connector. The round wire contacts in the outlet plug are crimped to terminals. Line assignment modules and cross connect assemblies can thus be constructed.

9 Claims, 7 Drawing Figures

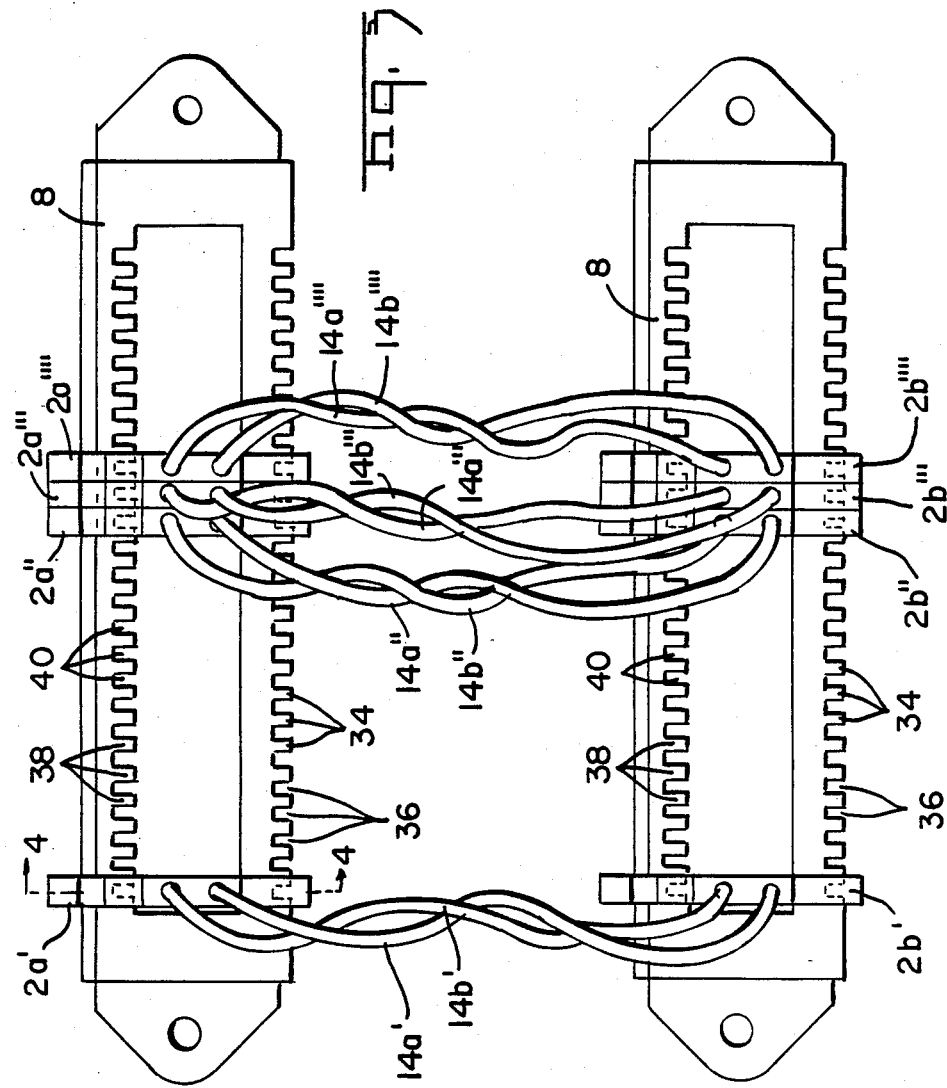

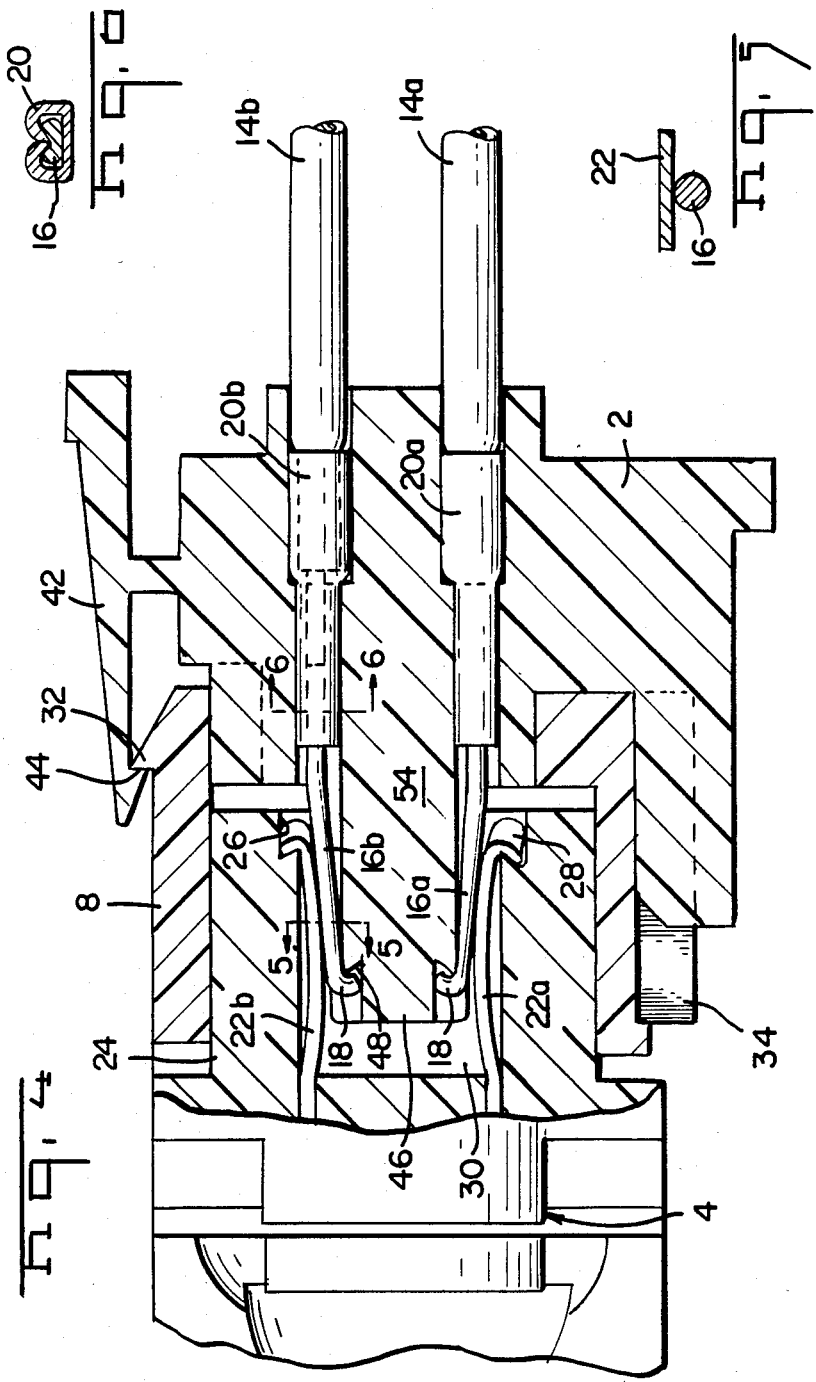

SINGLE COMMUNICATION LINE INTERCONNECT

BACKGROUND OF THE INVENTION

1. Field of the Invention

This invention relates to a system for establishing electrical communication with one or more lines of a multiconductor cable terminated to a multicontact electrical connector and more particularly relates to a single line jumper used in combination with a miniature ribbon connector to establish an electrical circuit with fewer than all of the conductors terminated to the miniature ribbon connector.

2. Description of the Prior Art

Telephone systems in office buildings require an extensive amount of electrical wiring. Some means must be provided for properly distributing the incoming telephone circuits to the proper location for the specific telecommunications equipment.

A central distribution assembly is generally provided for each office building. A number of cross-connection systems have been proposed for use as a distribution frame. The industry standard comprises a modular connecting block having a plurality of terminals comprising cantilever spring members with an insulation piercing slot therebetween. In use, an incoming cable generally consisting of twenty-five pairs of telephone wires, is positioned adjacent to a modular block. The individual wires are then load into position on the block and wires are attached to the contact terminals utilizing an appropriate hand tool. Wires in an outgoing cable can then be attached to the terminal, and individual wiring patterns can be established. These standard blocks are labor intensive. An installer must first attach all of the incoming conductors in an incoming cable to the modular connecting blocks. Then the installer must attach the proper wires in the outgoing circuit to the proper terminals. Each of these operations must be performed on site and the possibility of wiring errors is significant.

One method in which the on-site labor can be reduced, involves the use of multiconductor electrical connectors generally referred to as miniature ribbon connectors. The most common miniature ribbon connectors, such as that shown in U.S. Pat. No. 3,760,335, are used with a 25 pair electrical cable. A miniature ribbon connector typically has two rows of 25 contact terminals. Wires can be attached to one end of each connector terminal. Miniature ribbon connectors are designed to mate with corresponding connectors. Generally, terminals in a corresponding position in the two rows of a miniature ribbon connector are intended to be attached to the separate wires comprising a single twisted pair.

U.S. Pat. No. 4,335,929 discloses one module assembly for establishing interconnection with only a portion of the circuits terminated to a miniature ribbon connector. The line assignment module disclosed therein employs terminals of the same general construction as those used in the miniature ribbon connector disclosed in U.S. Pat. No. 3,760,335 to establish an interconnection with terminals and opposite rows of a female miniature ribbon connector. One problem with the line assignment module disclosed in U.S. Pat. No. 4,335,929 is that the thickness of the line assignment module cannot be reduced sufficiently to permit a separate module to establish interconnection with the next adjacent terminals in the rows of the miniature ribbon connector.

Although a cross connector distribution system and apparatus using a modular plug capable of establishing electrical interconnection with a single pair of terminals is disclosed in U.S. Pat. No. 4,221,445, such a device has not proved practical, and to date no practical line assignment module or cross connect apparatus employing a miniature ribbon connector having up to 50 positions is available in which the modular plug can be positioned at a single position to interconnect with two opposed terminals, while still retaining the capability of accepting a like modular plug in any other position, including the next adjacent position.

SUMMARY OF THE INVENTION

An electrical connector assembly for use in an electrical distribution system to selectively establish an interconnection between selected incoming circuits in a multiconductor cable and any combination of outgoing circuits, equal in number or less than the incoming circuits, includes one or more outlet plugs intermatable with a multiposition connector such as a miniature ribbon connector. In the preferred embodiment, the minature ribbon connector has a plurality of terminals positioned side by side in the housing and has a female mating surface in which flexible contact beams of each terminal are aligned in two oppositely facing rows. The resilient contact beams are substantially planar, with a flat contact surface on each terminal facing the corresponding opposite terminal of similar construction. Each outlet plug is adapted to make a connection with only one terminal in each row of the miniature ribbon connectors. Each outlet plug has a thickness no greater than the prescribed center line spacing of the miniature ribbon connector terminal. In this manner similar outlet plugs can be positioned side by side to make an interconnect with two adjacent terminals. Indeed individual outlet plugs can be employed to make an interconnection with any and/or all of the terminals in a conventional miniature ribbon connector. In the preferred embodiment, the outlet plugs have a male mating surface intermatable with a female mating surface of a conventional miniature ribbon connector and each outlet plug has two terminals each on oppositely facing surfaces of the mating portion. Each of the terminals in the outlet plug comprises a round wire contact which is anchored at its free end to the body of the outlet plug and which is attached to an individual conductor extending from the opposite end thereof. In the preferred embodiment of this invention, the round wire contact is crimped to a conductor. In this manner individual circuits can be selectively connected, especially in a telecommunications electrical distribution assembly.

BRIEF DESCRIPTION OF THE DRAWINGS

FIG. 3 is a view that interconnects between two miniature ribbon connectors showing three outlet plugs positioned in side by side relationship.

FIG. 4 is a sectional view taken along section lines 4—4 in FIG. 3 showing the construction of an outlet plug as mated to a miniature ribbon connector.

FIG. 5 is a sectional view taken along section lines 5—5 in FIG. 4 showing the contact between a round wire contact and a flat terminal in a miniature ribbon connector.

FIG. 6 is a sectional view taken along section lines 6—6 showing crimped interconnection between a crimping ferrule and the round wire contact.

DETAILED DESCRIPTION OF THE PREFERRED EMBODIMENTS

Figure 1:
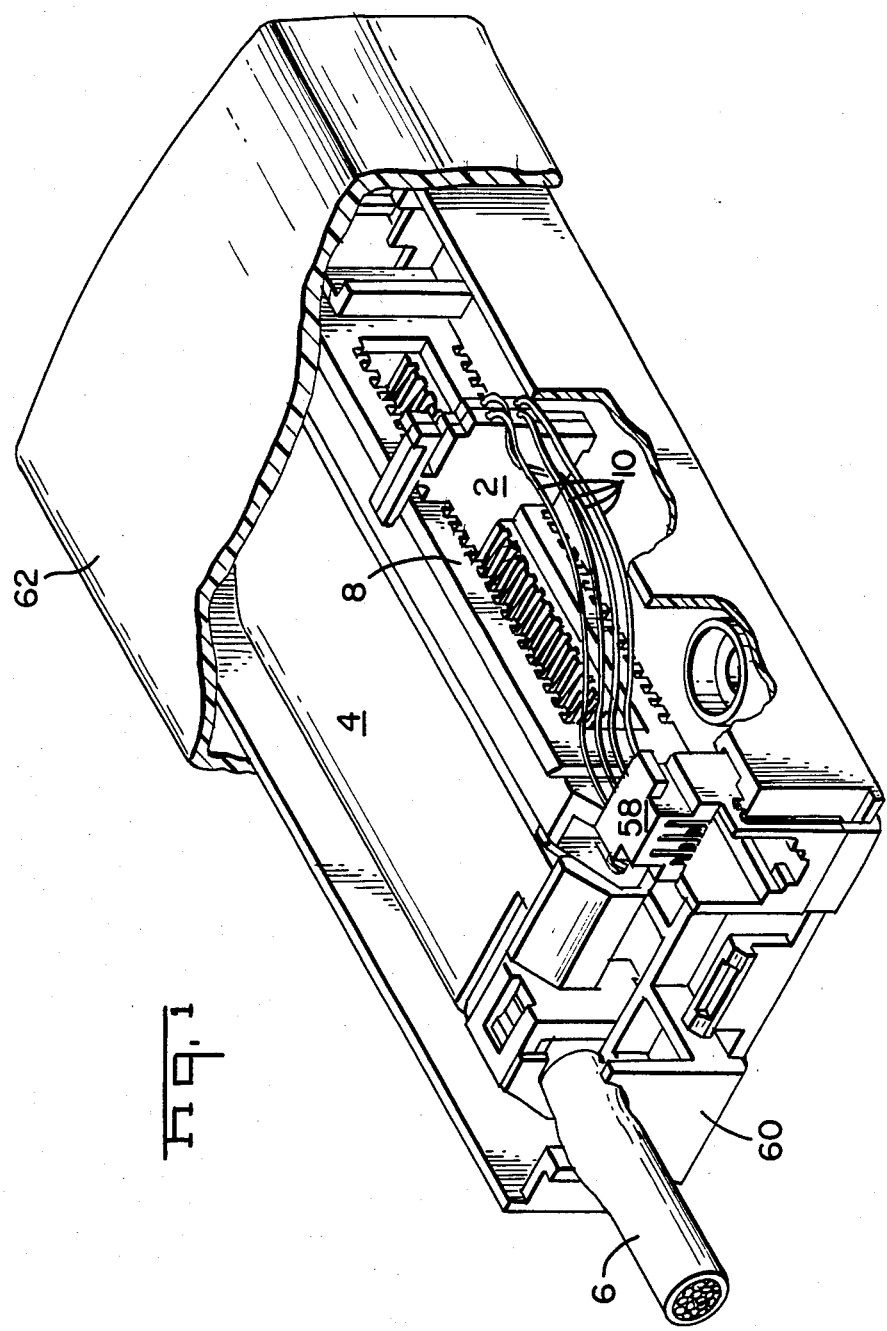
FIG. 1 is a line assignment adapted for estalishing interconnection between a modular plug and a miniature ribbon connector.
Figure 2:
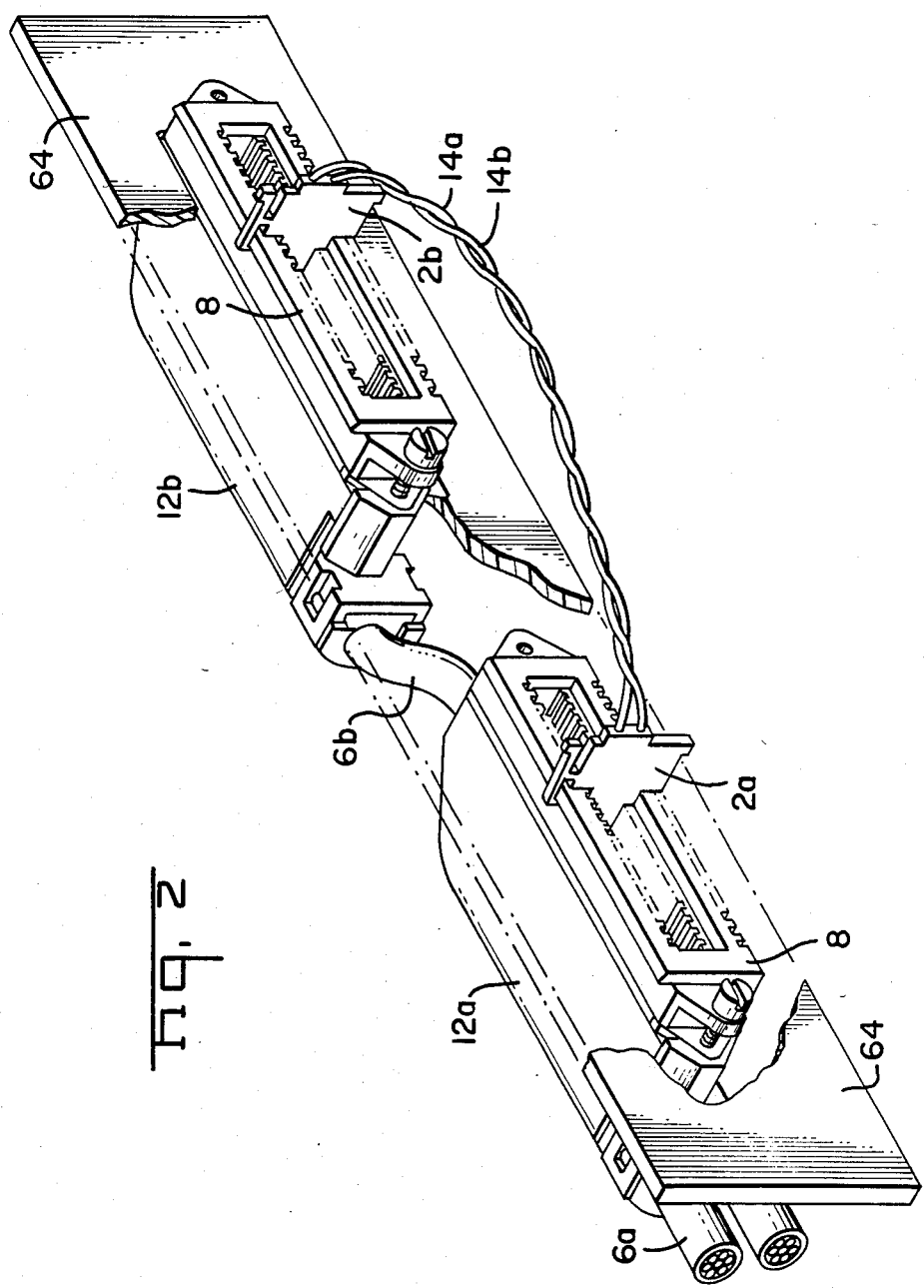
FIG. 2 is a cross connect assembly employing identical outlet plugs in each of two miniature ribbon connectors.

The outlet plug and miniature ribbon connector assembly which comprise the electrical distribution system of the preferred embodiment of this invention can be employed in a number of different capacities. FIG. 1 shows the use of an electrical distribution system consisting of a plurality of outlet plugs 2 and miniature ribbon connectors 4 in a line assignment module. In this assembly, the interconnection is made from individual circuits in a miniature ribbon connector to a modular telephone plug 58 of the type employed in a conventional telephone network. FIG. 2 depicts an electrical distribution assembly comprising a pair of miniature ribbon connectors 12a and 12b and a jumper assembly comprising two outlet plugs 2a and 2b each having two positions which are interconnected by a pair of twisted wires 14a and 14b.

A conventional miniature ribbon connector employs a plurality of contact terminals positoned in two rows. Perhaps the most common mniature ribbon connector is one adapted to terminate each wire in a 25 pair telephone cable such as cable 6 shown in FIG. 1. The most common type of miniature ribbon connector is a conventional connector adapted to establish an insulation displacement connection (not shown) with each wire in the cable. Other older types of miniature ribbon connectors are adapted to form a solder interconnection with each of the conductors in a 25 pair cable. In a conventional miniature ribbon connector the individual terminals positioned within an insulating housing are oriented in two separate rows with each terminal on a prescribed center line spacing. These conventional miniature ribbon connectors can be adpated to interconnect and a normal assembly of mated miniature ribbon connectors comprises a male and a female connector half. As used in the embodiments of FIGS. 1 through 7 a female miniature ribbon connector such as connectors 12a and 12b in FIG. 2 is especially well-suited for use in the preferred embodiment of this invention. FIG. 4 also shows a sectional view of a similar female miniature ribbon connector 4 at a terminal position in which an outlet plug 2 is interconnected with oppositely positioned miniature ribbon terminals 22a and 22b each at the same position within an insulating housing 24. It will be appreciated that the miniature ribbon terminals, such as terminals 22a and 22b in a female connector are resilient and are normally intended for intermating with similar flat terminals in the mating portion of a male miniature ribbon connector half.

Figure 7:
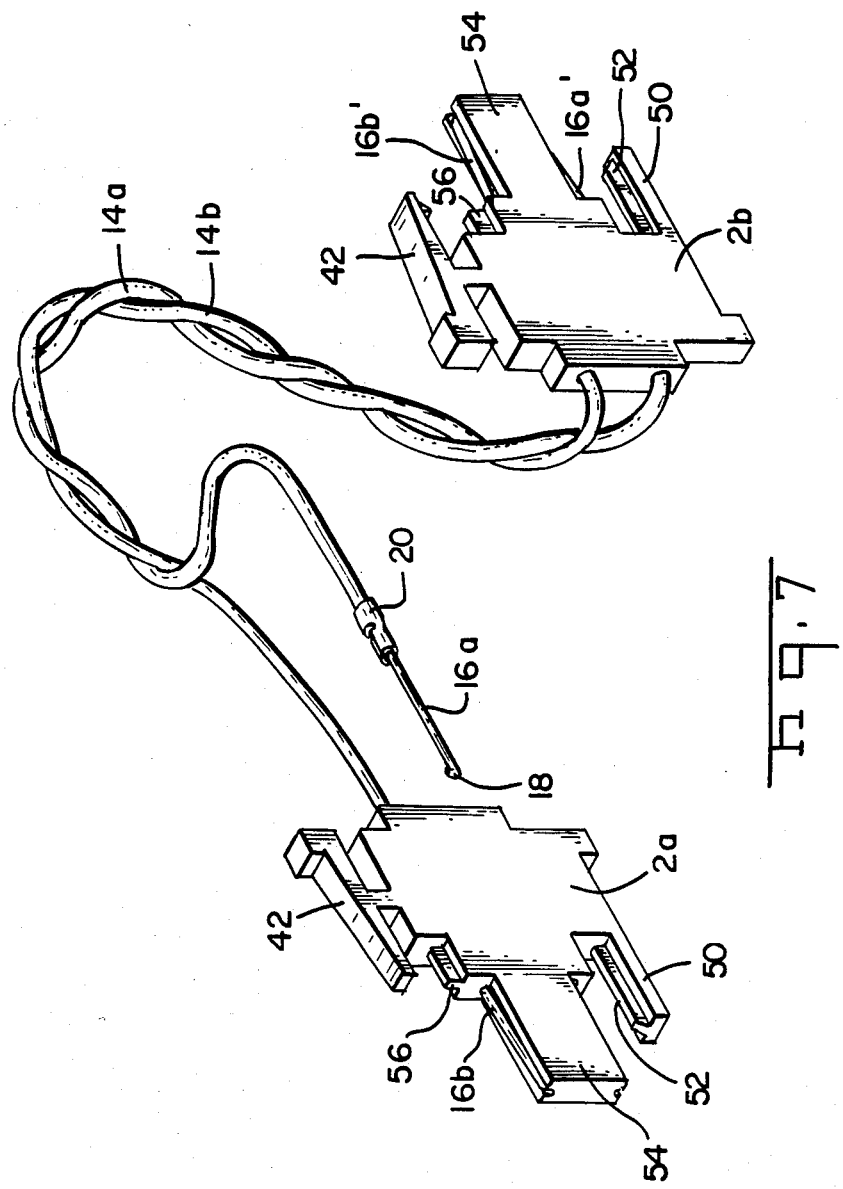
FIG. 7 is a view of an outlet plug assembly showing the manner in which the round wire contacts are mounted in the outlet plugs.

Individual outlet plugs such as outlet plugs 2 in FIG. 1, outlet plugs 2a', 2a'', 2a''', and 2a'''' and their corresponding outlet plugs 2b', 2b'', 2b''' and 2b'''' in FIG. 3 and the outlet plugs 2a and 2b in FIG. 7 are especially adapted for interconnection to oppositely facing miniature ribbon terminals located at the same lateral position in the mating portion of a female miniature ribbon connector. As best shown in FIG. 3, these outlet plugs such as outlet plugs 2a'', 2a''' and 2a'''' are especially adapted to be positioned in mating relationship with adjacent miniature ribbon terminals. Since these miniature ribbon terminals are on a prescribed center line spacing it follows that the width of the individual outlet plugs must be no greater and preferably must be slightly less than the center line spacing of adjacent miniature ribbon terminals. In a conventional miniature ribbon connector this center line spacing is 0.085 inches.

As best shown in FIG. 7 a single outlet plug, such as outlet plug 2a, comprises an insulating body which has a male mating portion 54. Two round wire contacts, such as contacts 16a and 16b can be positioned along opposite edges or surfaces of the male mating portion 54 of a single outlet plug. The free ends 18 of the round wire contacts 16a and 16b are bent back and retained or anchored within cusps 48 located on the free end of mating portion 54. The mating sections of the round wire contacts adjacent free ends 18 are inherently resilient and as will be described hereinafter are especially adapted to make contact with a flat surface of a planar miniature ribbon terminal in the mating portion of a female miniature ribbon connector. Each round wire contact 16a and 16b is mechanically and electrically secured to separate conductors, such as wires 14a and 14b by a crimped ferrule, 20a and 20b. This crimped ferrule is of conventional construction and a crimped interconnection with round wire contact 16a and 16b is formed at one end, while a similar crimp termination to a wire is formed at the opposite end. This crimped ferrule is suitable for making an interconnection to a solid round wire contact 16a and 16b at one end and to a solid or stranded wire conductor at the opposite end. Of course the round wire contact 16a and 16b and the crimped ferrules 20a and 20b are recieved within axially extending passageways extending from the rear of the outlet plug body to the portion of the outlet plug body adjacent the mating portion 54. In the preferred embodiment of this invention, these holes or bores are in alignment with grooves formed on the mating edges of mating portion 54. The exposed portion of the round wire contacts are held in position within the grooves extending along the mating edges of the mating portion 54.

A third component of the interconnection assembly between the miniature ribbon connector and the outlet plug is an adaptor bracket assembly 8 which comprises a generally rectangular housing which can be secured to the miniature ribbon connector, for example by mounting screws at the opposite ends thereof. This adaptor mounting bracket forms a tongue and groove assembly for receiving individual outlet plugs, best seen in FIG. 3. Along one surface of the adaptor bracket, adjacent tongues 38 define grooves 40 therebetween. This tongue and groove assemby is positioned on the interior of the adaptor bracket. Along the other side of the adaptor bracket similar outwardly facing tongues 34 define intermediate grooves 36. The respective grooves 40 and 36 are in mutual alignment and are also adapted to position in alignment with the mating portions of opposed miniature ribbon terminals. The width of grooves 36 and 40 is sufficient to receive respective keying surfaes 52 and 56 defined along the insulating body adjacent the mating portions 54. As seen in FIG. 7 these keys 52 and 56 have a width less than the width of the individual modular plugs. Similarly grooves 36 and 40 have a width less than the center line spacing of the miniature ribbon terminals. The adaptor bracket also has an outwardly facing lip 32 defined along one surface thereof. This lip 32 is adapted for engagement with a latching surface 44 on an integral releasing latch 42 defined along one edge of the outlet plug 2 and is best seen in FIG. 4.

Using the outlet plug described herein electrical connection can be made with any of the terminals in a miniature ribbon connector. The outlet plug is simply inserted through the adaptor housing 8 with keys 52 and 56 in alignment with grooves 36 and 38 to position the round wire contact 16 in registry with the terminals 22 in a miniature ribbon connector. The round wire contacts, which retain their inherent resiliency engage the resilient beams of miniature ribbon terminals 22 to form a suitable electrical connection. The contact between the round wire contact 16 and the flat terminals 22 is depicted in FIG. 5. The use of the round wire contacts permits interconnection to be made with any terminal in any row in a miniature ribbon connector, including the next adjacent terminal as shown in FIG. 3.

It will be appreciated by those skilled in the art that the embodiment depicted herein comprises only the preferred embodiment of this invention and this invention can be embodied in other configurations differing in detail but not differing in substance. For example a female outlet plug could be constructed according to the same principles for interconnection with a male miniature ribbon connector. Therefore the following claims are in no way restricted to the specific preferred embodiment depicted herein.

What is claimed is:

1. An electrical distribution system for use in selectively establishing an interconnection between selected incoming circuits and any combination of outgoing circuits equal in number or less than the incoming circuits, comprising:
   at least one miniature ribbon connector having side by side flat flexible terminals in two opposed rows, each terminal being positioned on a prescribed centerline spacing:
   at least one outlet plug, each plug matable with the miniature ribbon connector and comprising means for establishing an interconnection to only one terminal in each row, each outlet plug having a thickness no greater than the prescribed centerline spacing of the miniature ribbon terminals, separate outlet plugs being engageable with the miniature ribbon connector adjacent an identical plug, to contact an adjacent miniature ribbon terminal, each plug having a round wire contact disposed thereon having a resilient mating portion intermediate the round wire contact ends oriented to engage a miniature ribbon terminal when the outlet plug is mated to the miniature ribbon connector, and contact means for interconnecting the round wire contact to a separate conductor to complete a single circuit.

2. The system of claim 1 wherein each outlet plug includes two round wire contacts disposed on the outlet plug in oppositely facing directions.

3. The system of claim 2 wherein the contact means comprises a crimpable ferrule engagable with each round wire contact and each separate conductor.

4. An electrical distribution system for use in selectively establishing an interconnection to selected circuits in a multiconductor electrical cable, comprising:
   a miniature ribbon connector having a plurality of temrinals positioned in a housing, each terminal having conductor engaging means on one end thereof for establishing electrical contact with one conductor in the multiconductor cable and a mating portion comprising a flat flexible beam, a plurality of terminals being arranged with the mating flexible beams being positioned side by side on a prescribed centerline spacing, and
   at least one outlet plug matable with the miniature ribbon connector and comprising means for establishing electrical continuity with an individual terminal in the miniature ribbon connector, each outlet plug comprising an insulating housing having a thickness no greater than the prescribed centerline spacing of the terminal flexible beams and having a male portion matable with the miniature ribbon connector; a conductive round wire contact disposed in the insulating housing having a resilient mating portion intermediate the resilient round wire contact ends, disposed on the male portion and oriented to engage a terminal flat flexible beam when the outlet plug is mated to the miniature ribbon connector, and contact means for interconnecting the round wire contact to a separate conductor to complete a single circuit.

5. A telecommunications distribution assembly for establishing a plurality of circuits between incoming telecommunications cabling and on-premise telecommunications equipment, said assembly comprising:
   (a) a plurality of multi-positioned miniature ribbon connector receptacles of the type having two rows of receptacle contact terminals, with corresonding terminals in opposite rows in certain incoming connector receptacles connected each to one of the wires in an associated pair of incoming first wires in said cabling, and with terminals in outgoing connector receptacles being connected to second wires leading to the on-premise telecommunications equipment, said terminals having resilient receptacle contact portions located in two rows along opposite sides of a mating recess provided in one side of a corresponding one of said receptacles.
   (b) one or more jumper assemblies, each comprising a pair of conductors having their ends electrically and mechanically secured to plug members, each jumper assembly having one said plug member thereof inserted into said mating recess of selected said incoming receptacle and a remaining said plug member thereof inserted into said mating recess of a selected said outgoing receptacle, so that said pair of conductors interconnect corresponding terminals of said selected incoming receptacle with corresonding terminals in said selected outgoing receptacle, each said plug member including:
   (i) a housing having a wire receiving portion, for receiving ends of corresponding conductors and a receptacle mating portion for pluggable insertion into a mating recess of a selected receptacle, and
   (ii) a pair of conductive jumper terminals, each comprising a conductive round wire crimped on one end to a corresponding conductor, each conductive wire having a resilient mating portion intermediate the wire contact ends disposed on the receptacle mating portion, each conductive wire engaging a corresponding receptacle terminal when the plug member is inserted into the mating recess of a miniature ribbon connector receptacle.

6. An electrical distriubtion system comprising:
a miniature ribbon connector receptacle having a receptacle housing and two opposite rows of side-by-side receptacle contact terminals located on a prescribed centerline spacing, corresponding receptacle terminals in opposite rows being in mutual alignment, flat resilient beams on the receptacle terminals being located along the two opposite sides of a mating recess on the receptacle housing:
an adaptor bracket mounted on the miniature ribbon connector, the bracket having two rows of grooves, individual grooves being in alignment with corresponding receptacle contact beams; and
a plug comprising a plug housing with a male portion insertable into the mating recess in alignment with the flat resilient beams of a pair of coresonding terminals in opposite rows in mutual alignment, the width of the plug being no greater than the prescribed centerline spacing, a tongue on each side of the male portion being insertable into a corresponding bracket groove, and two round wire contact terminals, each having a resilient mating portion for engagement with the flat resilient beam of a corresponding receptacle terminal, whereby a plug can be inserted to establish electrical contact with any selected pair of corresponding receptacle terminals in the miniature ribbon connector.

7. The system of claims 4 or 6 wherein the round contact terminal extends from a bore in the plug housing, with the free end being anchored adjacent an end of the male portion spaced from the bore, the portion of the round wire contact terminal between the bore and the free end being resilient and engagable with the flat beam of the receptacle contact terminal.

8. The system of claim 7 further comprising a crimped ferrule attached to the round wire contact terminal and to a separate conductor.

9. The system of claim 8 wherein the ferrule is located within the bore.

* * * * *